Oct. 10, 1950  F. S. HAWKINS ET AL  2,525,032
PHOTOGRAPHIC FLASH BULB
Filed March 14, 1947

Inventors:
Frank Swain Hawkins,
Arthur George Pearce,
by John H. Anderson
Their Attorney.

Patented Oct. 10, 1950

2,525,032

UNITED STATES PATENT OFFICE 2,525,032

PHOTOGRAPHIC FLASH BULB

Frank Swain Hawkins, Wembley, and Arthur George Pearce, North Wembley, England, assignors to General Electric Company, a corporation of New York Application March 14, 1947, Serial No. 734,574
In Great Britain March 18, 1946

3 Claims. (Cl. 67—31)

This invention relates to flash-bulbs for photographic purposes and one object of the present invention is the provision of a flash-bulb which is particularly suitable for use with cameras of the type which use a focal plane shutter. In cameras of this type, although the time of exposure of individual areas of a film or plate is short, the total time the shutter is operating is relatively long. Thus, a slit in the shutter may expose individual areas for say $1/100$ second, but the time taken for the slit to travel its complete distance may be of the order of $1/10$ second. Because of this, it is necessary that a flash-bulb should provide a flash which lasts at least for the period during which the slit is traversing its complete distance but not greatly in excess of this period, whilst providing a maximum amount of illumination of fairly constant value during the period.

An object of the present invention is the provision of a flash-bulb arranged to provide a flash which lasts for a period of the order of $1/10$ second.

According to the present invention, a flash-bulb for photographic purposes comprises a filament, thread, strip or like element of length considerably greater than its cross-sectional periphery, carrying or formed at least in part of a material arranged upon combustion to yield actinic light, and means for igniting the material at one part of the filament, thread, strip or the like element in such manner that the process of combustion is arranged to travel along it.

The bulb may comprise a plurality of filaments or threads coated with a material arranged upon combustion to yield actinic light, and means to ignite the material on the filaments or threads at one end thereof in such manner that the process of combustion travels along all the filaments or threads from one end to the other at the same time.

Preferably, a single igniter or primer comprising a filament arranged to be heated by an electric current and provided in known manner with a suitable coating, is adapted to ignite all the filaments or threads and the igniter or primer may be so shielded that it can only ignite the filaments or threads at one end.

Figure 1:
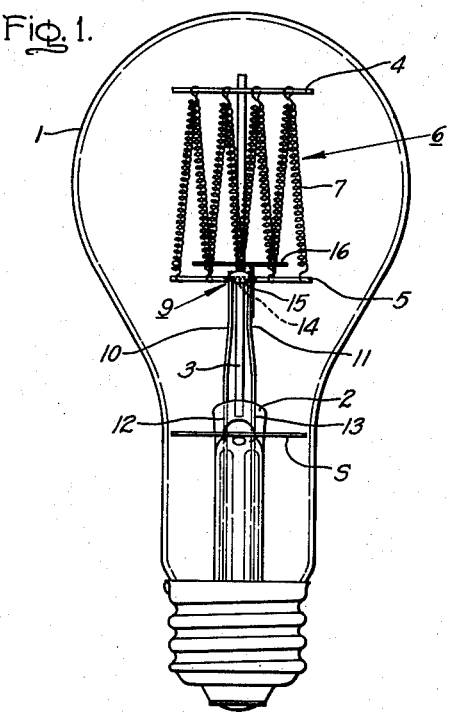
Figure 3:
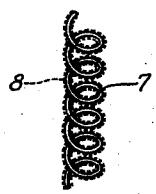
Figure 4:
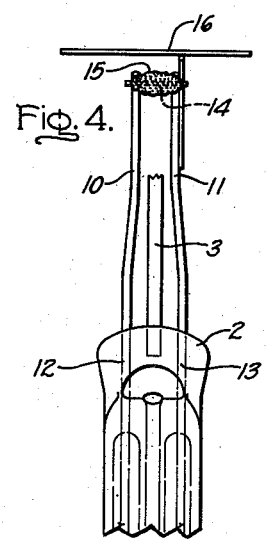
Figure 5:
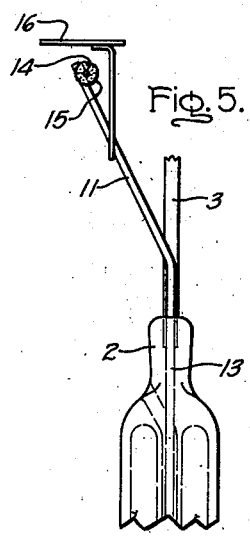

One construction of photographic filash-bulb in accordance with the present invention will now be described by way of example with reference to the accompanying drawings in which Figure 1 shows a side elevation of the flash-bulb, Figure 2 also shows a side elevation but at an angle of 90° to that of Figure 1. Figure 3 shows an enlarged view of a coated filament, and Figures 4 and 5 show views at right angles to one another of the flash-bulb primer.

Referring now to the drawings, the photographic flash-bulb comprises a sealed glass bulb 1 of the usual shape containing oxygen or other suitable gas and mounted on the pinch 2 of the bulb 1 is a frame comprising a single metal rod 3 along the axis of the bulb 1 and two further metal rods 4, 5 welded a distance apart on to the rod 3 at right angles to the bulb axis and parallel to one another.

On those two parallel rods 4, 5 is wound in zig-zag fashion a grid 6 comprising a coiled tungsten wire 7 (see Figure 3), the coils of the wire 7 being quite open, and the wire 7 is coated with a material 8 which, upon combustion, yields actinic light. The material may be applied to the wire 7 by any suitable process such as dipping or painting. Any suitable known coating material may be used and one suitable composition of material comprises a mixture of a powdered zirconium and lead peroxide and a binder such as nitro-cellulose.

In coating the wire 7, the coating is applied when the wire is wound on the rods 4, 5 and it is advisable to avoid the formation of large blobs of the material 8 because such blobs tend, upon combustion, to throw off heated particles which, on hitting the glass of the bulb 1, may cause it to shatter.

A primer 9 (see particularly Figures 4 and 5), mounted at that end of the grid 6 adjacent to the pinch 2, comprises a short tungsten filament 14 mounted on supporting rods 10, 11 and connected to two leads 12, 13 which are sealed through the pinch 2, the supply of current for heating the filament 9 passing through rods 10, 11 and the leads 12, 13. The tungsten filament 14 is coated with material 15 of nature similar to that used for the grid 6 and, upon current passing through the filament 14 to heat it, the material burns and shoots off small luminous particles which ignite the coating 8 of the grid 6. The primer 9 is mounted centrally with respect to the axis of the grid 6 and approximately level with the cross rod 5 adjacent to the pinch 2.

In order to prevent luminous particles being sent to all parts of the grid 6 when the primer 9 is ignited, a shield 16 is placed over it on the grid side in such manner that particles are only directed at the pinch ends of the various lengths of wire 7 forming the grid 6. Therefore, when the primer 9 is ignited, only the pinch end of the grid 6 is ignited and combustion travels along the various lengths of wire 7 of the grid 6, from this end to the other and the resulting combustion time is determined by the spacing between the rods 4, 5 and the amount and nature of the coating material 8. The light output depends upon the number of lengths of wire 7 and the amount and nature of coating material 8 on the wire 7.

The coiled tungsten wire 7 of the grid 6 which is coated with the combustible material 8 may burn partially or completely but, if desired, the wire 7 may be replaced by a material that does not burn. Alternatively, a grid wound with cotton thread may be used or, instead of a wound grid, a brush consisting of a number of straight wires held at one end in a common support may be used.

Figure 2:
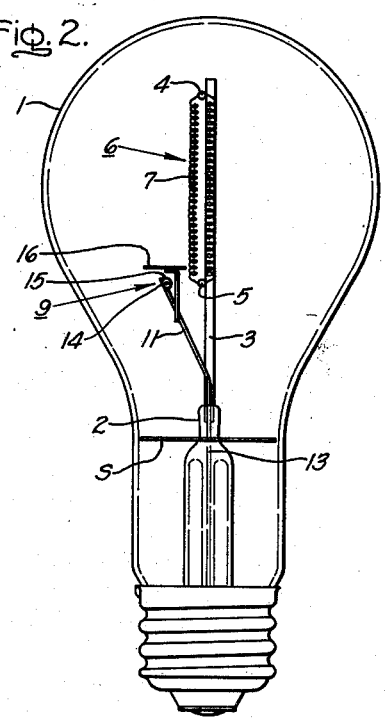

The bulb 1 of the device described above may be coated both inside and outside with varnish in known manner and, as shown in Figures 1 and 2, an asbestos shield S may be provided.

We claim:

1. A flash-lamp comprising a bulb, combustible material arranged in an extended path within said bulb and adapted upon combustion to yield a flash of actinic light, ignition means in said bulb disposed within effective ignition range of the combustble material at one end of the extended path thereof, and shield means mounted in said bulb adjacent said ignition means and masking substantially all but the said one end of the combustible material from said ignition means whereby to confine ignition of the combustible material by said ignition means solely to the said one end of the path thereof.

2. A flash-lamp comprising a bulb, a plurality of elongated filamentary elements extending longitudinally of the bulb in side-by-side spaced relation and having at least the surface layer thereof of combustible material adapted upon combustion to yield a flash of actinic light, ignition means in said bulb disposed within effective ignition range of the combustible material at one end of the said filamentary elements, and shield means mounted in said bulb adjacent said ignition means and masking substantially all but the said one end of the filamentary elements from said ignition means whereby to confine the ignition of the combustible material by said ignition means solely to the said one end of the filamentary elements so that the combustion process travels progressively therealong.

3. A flash-lamp comprising a bulb, a plurality of elongated filamentary elements extending longitudinally of the bulb in side-by-side spaced relation and coated with a combustible material adapted upon combustion to yield a flash of actinic light, ignition means comprising a filament at least partly coated with a fulminating substance and disposed closely adjacent one end of the said filamentary elements, and a shield mounted in said bulb adjacent said ignition means and masking substantially all but the said one end of the filamentary elements from said ignition means whereby to confine ignition of the combustible material by said ignition means solely to the combustible material at the said end of the filamentary elements so that the combustion process travels progressively therealong.

FRANK SWAIN HAWKINS.
ARTHUR GEORGE PEARCE.

REFERENCES CITED

The following references are of record in the file of this patent:

UNITED STATES PATENTS

| Number | Name | Date |
|---|---|---|
| 1,751,407 | Hurwitz | Mar. 18, 1930 |
| 1,938,600 | Marsat | Dec. 12, 1933 |
| 1,996,621 | Kurlander | Apr. 2, 1935 |
| 2,291,983 | Pipkin | Aug. 4, 1942 |

FOREIGN PATENTS

| Number | Country | Date |
|---|---|---|
| 503,540 | Great Britain | Apr. 11, 1939 |